United States Patent
Ogawa

(10) Patent No.: US 7,392,695 B2
(45) Date of Patent: Jul. 1, 2008

(54) WHEEL ASSEMBLY, WHEEL AND WHEEL CONDITION DETERMINING APPARATUS

(75) Inventor: Atsushi Ogawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/634,141

(22) Filed: Dec. 6, 2006

(65) Prior Publication Data
US 2007/0074567 A1    Apr. 5, 2007

Related U.S. Application Data

(62) Division of application No. 11/058,207, filed on Feb. 16, 2005, now Pat. No. 7,284,585.

(30) Foreign Application Priority Data

Mar. 2, 2004    (JP)    ............................... 2004-057252

(51) Int. Cl.
*E01C 23/00*    (2006.01)
(52) U.S. Cl. ........................................................ 73/146
(58) Field of Classification Search ................. 152/410; 340/442, 443, 445; 73/146.3, 146.4, 146.5, 73/462

See application file for complete search history.

(56) References Cited

U.S. PATENT DOCUMENTS

| | | | |
|---|---|---|---|
| 3,934,223 A | 1/1976 | Barabino et al. | |
| 4,570,691 A | 2/1986 | Martus et al. | |
| 4,820,166 A * | 4/1989 | Farrell, II | 434/376 |
| 4,969,350 A * | 11/1990 | Fogal, Sr. | 73/40.7 |
| 5,343,920 A * | 9/1994 | Cady | 152/396 |
| 5,629,873 A * | 5/1997 | Mittal et al. | 702/140 |
| 5,798,414 A * | 8/1998 | Mishima et al. | 525/77 |
| 6,293,147 B1 * | 9/2001 | Parker et al. | 73/462 |
| 7,138,910 B2 * | 11/2006 | Ogawa | 340/442 |
| 2002/0069008 A1 | 6/2002 | Nantz et al. | |
| 2004/0233050 A1 | 11/2004 | Burghardt | |
| 2004/0261510 A1 | 12/2004 | Beru | |

FOREIGN PATENT DOCUMENTS

| | | |
|---|---|---|
| DE | 28 13 601 A1 | 10/1979 |
| DE | 3631712 A1 | 3/1988 |
| EP | 0 166 123 | 1/1986 |
| EP | 0 344 004 A2 | 11/1989 |
| EP | 1 464 518 A2 | 10/2004 |
| JP | 03-40104 | 4/1991 |
| JP | 09-508870 | 9/1997 |
| WO | WO 03/011617 A1 | 2/2003 |

* cited by examiner

*Primary Examiner*—Jewel V Thompson
(74) *Attorney, Agent, or Firm*—Oliff & Berridge, PLC

(57) ABSTRACT

An air pressure inside a tire is positively adjusted to an optimum state. In a wheel assembly, a tire is attached to a wheel. A pressurizing means is provided in the wheel assembly for pressurizing air inside the tire. A depressurizing means is also provided in the wheel assembly for depressurizing the air inside the tire. A pressurization limiting means is provided in the wheel assembly for limiting an operation of the pressurizing means in accordance with a pressure of the air inside the tire.

3 Claims, 7 Drawing Sheets

WHEEL ASSEMBLY, WHEEL AND WHEEL CONDITION DETERMINING APPARATUS

This is a Division of application Ser. No. 11/058,207 filed Feb. 16, 2005 now U.S. Pat. No. 7,284,585. The disclosure of the prior application is hereby incorporated by reference herein in its entirety.

BACKGROUND

1. Field of the Invention

The present invention relates to a wheel assembly and, more particularly, to a wheel assembly containing a wheel and a tire of which an internal air pressure is adjustable and a wheel condition determining apparatus that can detect an abnormality in such a wheel assembly.

2. Description of the Related Art

Generally, an air compressed at a predetermined pressure is charged in a tire so as to reduce vibrations during running of a vehicle. The tire is hermetically sealed so that the predetermined pressure is maintained inside the tire. However, the air inside the tire may slowly leak outside over time, depending on a weight of the vehicle, a material of the tire or a running condition of the vehicle, which is referred to as a natural air leak phenomenon. In order to suppress an influence of the natural air leak phenomenon, there have been suggested various devices. For example, the air pressure inside the tire is maintained by a technique such as disclosed in Japanese Laid-Open Patent Application No. 9-508870 that compensates for a drop in the tire pressure using a centrifugal force generated during rotations of the tire.

Although, the above-mentioned technique that compensates for a drop in the tire pressure using a centrifugal force generated during rotations of the tire is excellent in that a drop in an air pressure inside a tire can be semi-automatically compensated for, there may be a case in which it is difficult to adjust an air pressure inside the tire accurately to an optimum state. For example, an excessive centrifugal force may be generated depending on a rotational condition of a wheel, which results in an excessive air charged into the tire.

SUMMARY

It is a general object of the present invention to provide an improved and useful wheel assembly in which the above-mentioned problems are eliminated.

A more specific object of the present invention is to provide a technique to positively adjust an air pressure inside a tire to an optimum state.

Another object of the present invention is to provide a technique to detect an abnormality of a wheel assembly having a function to adjust an air pressure inside a tire thereof.

In order to achieve the above-mentioned objects, there is provided according to one aspect of the present invention a wheel assembly comprising: a tire attached to a wheel; pressurizing means for pressurizing air inside the tire; depressurizing means for depressurizing the air inside the tire; and pressurization limiting means for limiting an operation of the pressurizing means in accordance with a pressure of the air inside the tire.

According to the above-mentioned wheel assembly, air inside the tire can be depressurized by the depressurizing means in a state where an operation of the pressurizing means is limited by the pressurization limiting means. Thus, the air pressure inside the tire can be positively and efficiently decreased, and, thereby, the air pressure inside the tire can be positively adjusted to an optimum air pressure.

In the wheel assembly according to the present invention, the pressurization limiting means may include a pressurization limiting piston being operated in accordance with a pressure of the air inside the tire so as to limit the operation of the pressurizing means. In this case, an operation of the pressurizing means is limited by the pressurization limiting piston being operated according to the air pressure inside the tire.

In the above mentioned wheel assembly, the pressurizing means may include a pressurization chamber that stores pressurized air to be supplied to the tire, and the pressurization limiting piston may be arranged to be at a position where the pressurization chamber is prevented from being communicated with inside the tire when the air inside the tire is at a pressure equal to or higher than a predetermined pressure.

The wheel assembly according to the present invention may further comprise depressurization limiting means for limiting an operation of the depressurizing means in accordance with a pressure of the air inside the tire. In this case, the air pressure inside the tire can be increased in a state where the operation of the depressurizing means is limited by the depressurizing means.

In the wheel assembly according to the present invention claimed in claim 1, the pressurizing means may include a pressurizing piston being operated using a centrifugal force generated by rotation of the wheel assembly so as to pressurize the air inside the tire. In this case, the pressurizing piston can be efficiently operated using a centrifugal force generated during rotation of the wheel assembly, thereby enabling an effective pressurization of the air inside the tire.

In the wheel assembly according to the present invention, the pressurizing means may include a pressurizing piston being operated using a force generated by rotation of the wheel assembly in a circumferential direction of the wheel assembly so as to pressurize the air inside the tire. In this case, the pressurizing piston can be efficiently operated using a force generated during rotation of the wheel assembly in a circumferential direction, thereby enabling an effective pressurization of the air inside the tire. The circumferential direction of the wheel assembly means a circumferential direction of the tire or the wheel, and indicates a tangential direction of any point on an outer periphery of the tire or the wheel.

Additionally, there is provided according to another aspect of the present invention a wheel configured and arranged to be attached with a tire, comprising: pressurizing means for pressurizing air inside the tire; depressurizing means for depressurizing the air inside the tire; and pressurization limiting means for limiting an operation of the pressurizing means in accordance with a pressure of the air inside the tire.

According to the above-mentioned wheel, the air pressure inside the tire can be decreased in a state where an operation of the pressurizing means is limited by the pressurization limiting means.

Additionally, there is provided according to another aspect of the present invention a wheel condition determining apparatus configured and arranged to detect an abnormality of a wheel assembly including a wheel and a tire attached to the wheel and having tire pressure adjusting means, the wheel condition determining apparatus comprising: tire pressure detecting means for detecting a pressure of air inside the tire; and abnormality detecting means for detecting an abnormality in the tire pressure detecting means.

According to the above-mentioned wheel condition determining apparatus, an abnormality in the tire pressure adjusting means can be detected by the abnormality detecting means. The tire pressure adjusting means indicates one having a function to adjust an air pressure inside the tire, and includes, for example, apparatuses that increase or decrease air inside the tire.

In the wheel condition determining apparatus according to the present invention, the tire pressure adjusting means may include pressurizing means for pressurizing the air inside the tire; and the abnormality detecting means may include pressurizing condition presuming means for presuming a pressurized state of the air inside the tire pressurized by the pressurizing means and pressurization abnormality detecting means for detecting an abnormality in the pressurizing means in accordance with a result of detection of the tire pressure detecting means and a result of presumption of the pressurizing condition presuming means. In this case, an abnormality in the pressurizing means can be detected by the pressurization abnormality detecting means.

In the wheel condition determining apparatus according to the present invention, the tire pressure adjusting means includes depressurizing means for depressurizing the air inside the tire; and the abnormality detecting means includes depressurizing condition presuming means for presuming a depressurized state of the air inside the tire depressurized by the depressurizing means and depressurization abnormality detecting means for detecting an abnormality in the depressurizing means in accordance with a result of detection of the tire pressure detecting means and a result of presumption of the depressurizing condition presuming means. In this case, an abnormality in the depressurizing means can be detected by the depressurization abnormality detecting means.

Other objects, features and advantages of the present invention will become more apparent from the following detailed description when read in conjunction with the accompanying drawings.

DETAILED DESCRIPTION OF EMBODIMENTS

A description will now be given, with reference to the drawings, of embodiments according to the present invention.

First Embodiment

Figure 1:
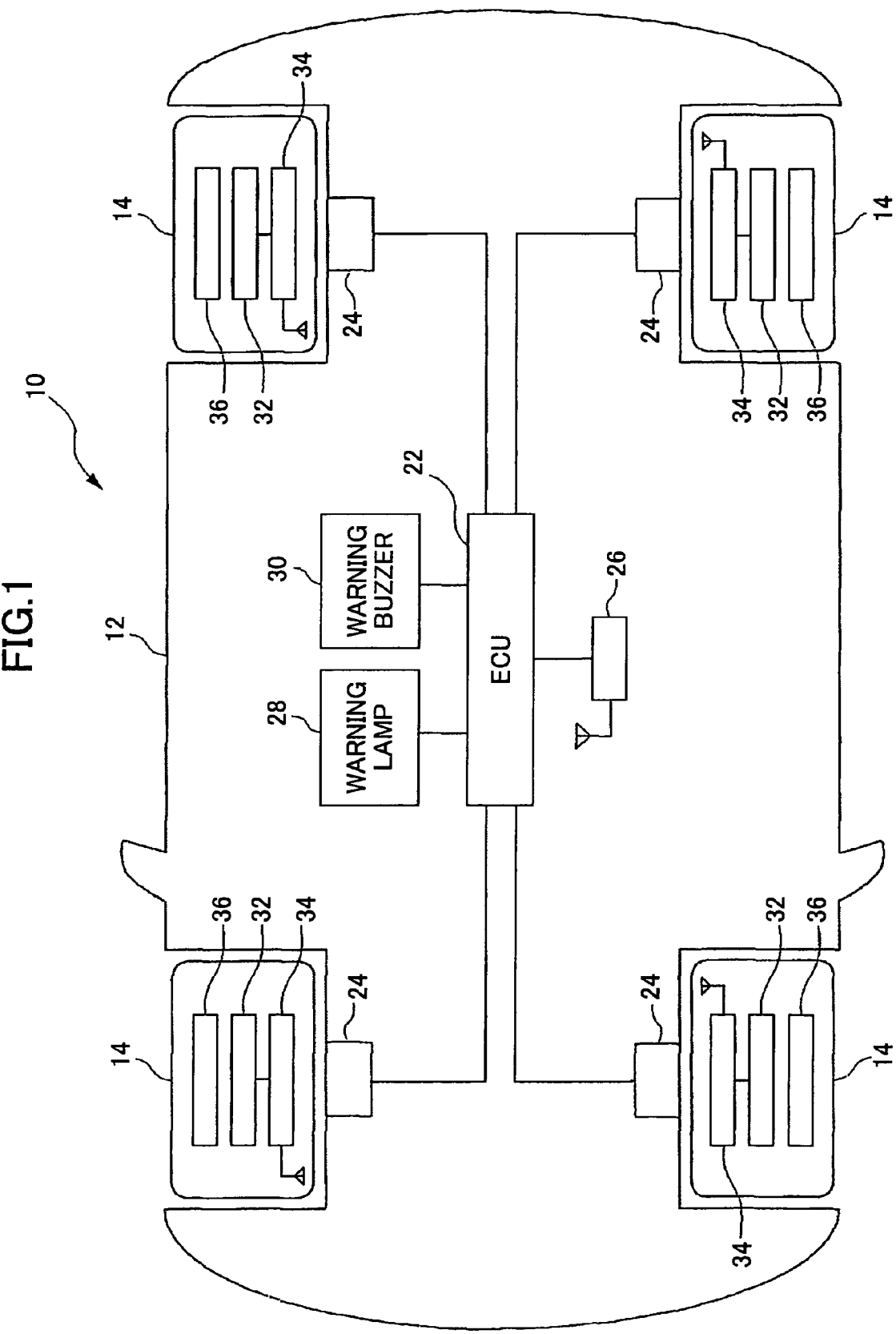
FIG. 1 is an illustration of a vehicle equipped with wheel assemblies according to a first embodiment of the present invention.

FIG. 1 is an illustration of a vehicle equipped with wheel assemblies according to a first embodiment of the present invention. The vehicle 10 comprises a vehicle body 12 and wheel assemblies 14 provided on left and right of front and rear sides of the vehicle body 12.

The vehicle body 12 comprises: an electronic control unit (hereinafter, referred to as ECU) 22; wheel speed sensors 24 connected to the ECU 22; a vehicle body side transmitter 26; a warning lamp 28; and a warning buzzer 30. Each of the wheel assemblies 14 is provided with a tire pressure monitoring system (TPMS) 32, a wheel side transmitter 34 connected to the TPMS 32, and a tire pressure adjusting apparatus 36. The TPMS 32 is capable of detecting a pressure of air inside a tire 16 of each wheel assembly 14. The tire pressure adjusting apparatus 36 is for adjusting the pressure of air inside the tire 16.

The ECU 22 controls various conditions of the vehicle 10 such as running conditions of the vehicle 10 in accordance with information sent from the vehicle body side transmitter 26, the wheel sensors 24 and other electronic devices (not shown in the figure). Additionally, the ECU 22 of the present embodiment serves as an abnormality detecting means for detecting an abnormality in the tire pressure adjusting apparatus 36 in accordance with results of detection of the TPMS 32, as mentioned later.

The wheel speed sensors 24 are provided to the respective wheel assemblies 14 so as to detect wheel speeds of the respective wheel assemblies 14 and send results of detection to the ECU 22. Each of the wheel speed sensors 24 comprises: a rotor rotating together with the corresponding wheel assembly 14; a plurality of rotor teeth provided to an outer circumference of the rotor at a predetermined pitch; and a magnetic pickup electro-magnetically detecting a movement of the rotor teeth caused by rotation of the rotor.

The vehicle body side transmitter 26 receives a result of detection of the TPMS 32, which is sent from each wheel side transmitter 34, and sends the received result of detection to the ECU 22.

Figure 2:
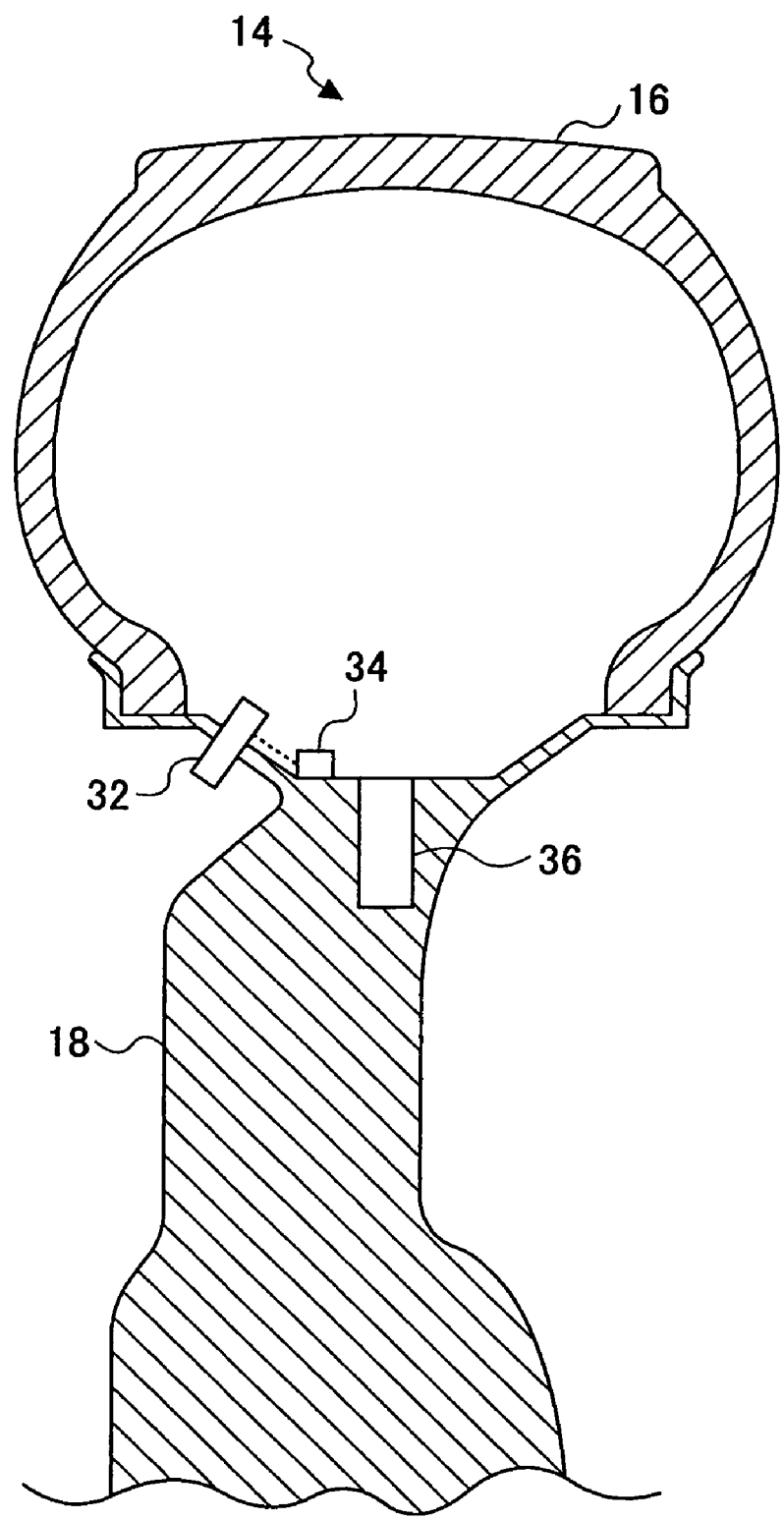
FIG. 2 is a cross-sectional view of a part of one of the wheel assemblies according the first embodiment of the present invention.

FIG. 2 is a cross-sectional view of a part of the wheel assembly 14. Each of the wheel assemblies 14 includes the tire 16 in which an air is charged and a wheel 18 supporting the tire 16.

The TPMS 32 is a sensor arranged to protrude from the wheel 18 into inside the tire 16 so as to directly detect a pressure inside the tire 16. Accordingly, it is possible to grasp an absolute value of an air pressure inside the tire 16 from the result of detection of the TPMS 32. The TPMS 32 sends the result of detection to the vehicle body side transmitter 26.

Each of the wheel side transmitters 34 is attached to the respective one of the wheels 18 so as to transmit by radio frequency to the vehicle body side transmitter 26 the result of detection regarding an air pressure inside the tire 16 sent from the corresponding TPMS 32. Each of the tire pressure adjusting apparatuses 36 is located at a part of the respective one of the wheels 18 facing an interior of the tire 16, and has a structure such as specifically shown in FIG. 3.

Figure 3:
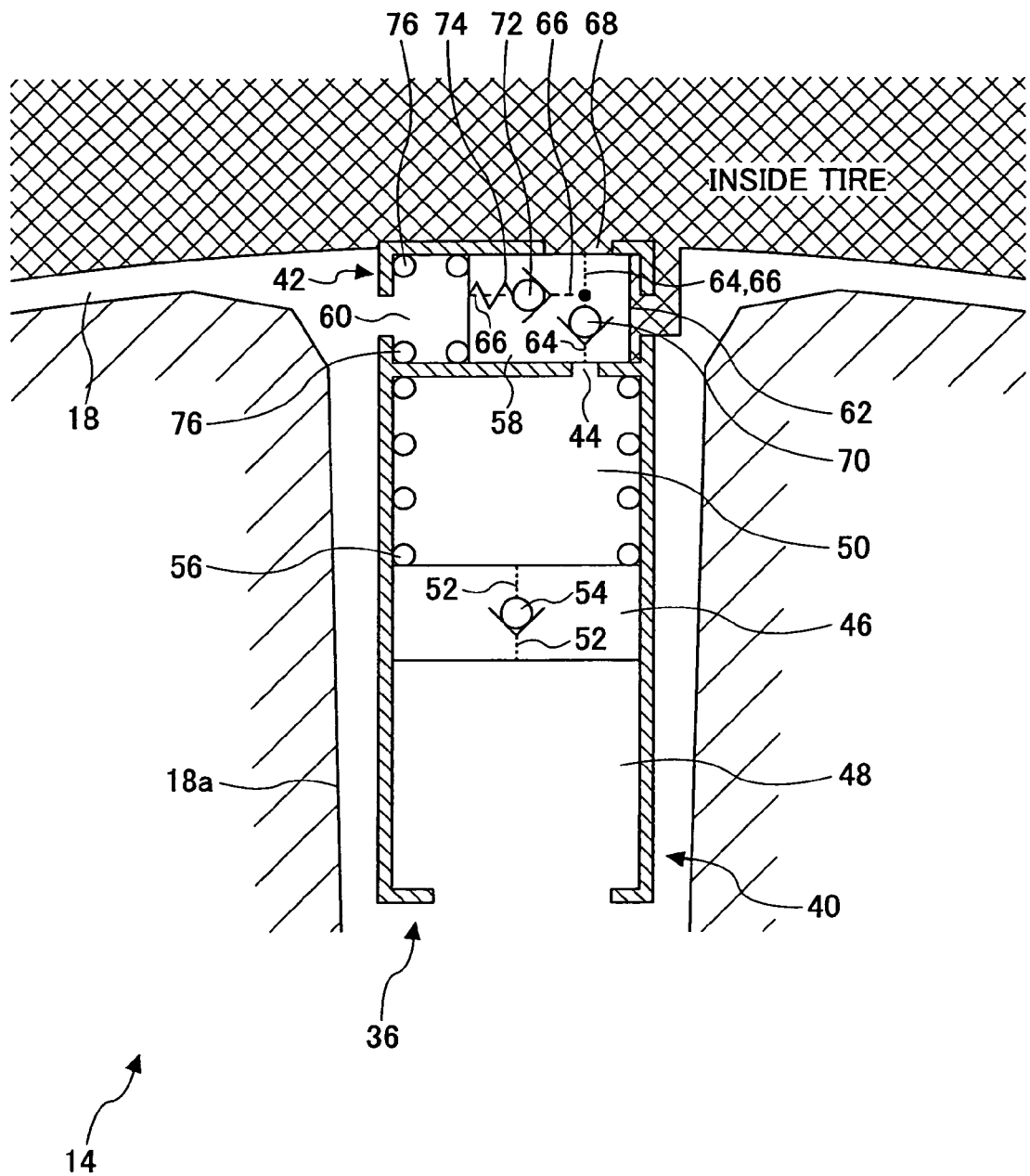
FIG. 3 is a cross-sectional view of a tire pressure adjusting apparatus according to the first embodiment of the present invention.

FIG. 3 is a cross-sectional view of each of the tire pressure adjusting apparatuses 36 according to the first embodiment of the present invention. The tire pressure adjusting apparatus 36 is arranged along a spoke 18a of the wheel 18, and has an elongated structure extending from the outer circumference to the center of rotation of the wheel 18. The tire pressure adjusting apparatus 36 has a first cylinder 40 provided on the side of the center of rotation of the wheel 18 and a second cylinder 42 provided on the side of the outer circumference of the wheel so as to be adjacent to the first cylinder 40. A pressurized air communication hole 44 is provided between the first cylinder 40 and the second cylinder 42 so as to communicate with each other.

An interior of the first cylinder 40 is divided by a pressurizing piston 46 accommodated therein without air gaps therebetween into a pressurizing air supply chamber 48 located on the side of the center of rotation of the wheel 18 and a pressurization chamber 50 located on the side of the outer circumference of the wheel 18.

The pressurizing piston 46 is movable along the first cylinder in a radial direction of the wheel 18 using a centrifugal force generated by rotation of the wheel assembly 14. A pressurization air supply passage 52 is provided in the pressurizing piston 46 so as to communicate the pressurization air supply chamber 48 and the pressurization chamber 50 with each other. A pressurization air supply valve 54 is provided at an intermediate part of the pressurization air supply passage 52 so as to adjust an amount of air flowing through the pressurization air supply passage 52.

The pressurization air supply valve 54 opens when an air pressure inside the pressurization chamber 50 is lower than an air pressure inside the pressurization air supply chamber 48 so as to supply an air from the pressurization air supply chamber 48 to the pressurization chamber 50 through the pressurization air supply passage 52. On the other hand, when the air pressure inside the pressurization chamber 50 is equal to or higher than the air pressure inside the pressurization air supply chamber 48, the pressurization air supply valve 54 closes so as to stop the supply of an air from the pressurization air supply chamber 48 to the pressurization chamber 50. Accordingly, if the air pressure inside the pressurization chamber 50 reaches an atmospheric pressure by air being supplied from the pressurization air supply chamber 48, the pressurization air supply valve 54 is closed. Thus, a pressurization limiting piston 58 moves to the side of the pressurization chamber 50 by a centrifugal force generated by rotation of the wheel assembly 14, which pressurizes the air in the pressurization chamber 50. Since the air inside the pressurization chamber 50 is higher than an atmospheric pressure while the air in the pressurization chamber 50 is pressurized, the pressurization air supply valve 54 is continuously closed. When the pressurizing piston 46 moves to the side of the pressurization air supply chamber 48 after air is supplied from the pressurization chamber 50 to inside the tire 16, the air pressure in the pressurization chamber 50 is decreased to be lower than the atmospheric pressure. At this time, the pressurization air supply valve 54 opens, and, thereby, air is supplied from the pressurization air supply chamber 48 to the pressurization chamber 50 through the pressurization air supply passage 52. Then, after the air pressure in the pressurization chamber 50 reaches the atmospheric pressure, the pressurization air supply chamber 48 closes again.

The pressurization air supply chamber 48 is a chamber for supplying air to the pressurization chamber 50 connected thereto through the pressurization air supply passage 52, and a part of the pressurization air supply chamber 48 is open to an atmosphere. Thus, air outside the wheel assembly 14 can freely flow into the pressurization air supply chamber 48, which maintains the air pressure in the pressurization air supply chamber 48 at the atmospheric pressure.

The pressurization chamber 50 is a chamber for pressurizing the air supplied from the pressurization air supply chamber 48 and delivering the pressurized air into the tire 16. A pressurizing piston adjusting spring 56 is provided in the pressurization chamber 50. The pressurizing piston adjusting spring 56 is one of elements that determine a magnitude of pressurization of the air inside the tire 16 when the tire pressure adjusting apparatus 36 serves as a pressurizing means for pressurizing the air inside the tire 16. Thus, characteristics of the pressurizing piston adjusting spring 56 such as a spring constant is determined so that the air pressure inside the tire 16 is appropriately increased when the tire pressure adjusting apparatus 36 serves as the pressurizing means.

The interior of the second cylinder 42 is separated into an atmospheric pressure chamber 60 and a tire air pressure chamber 62 by the pressurization limiting piston 58 accommodated therein without air gaps therebetween. A part of the atmospheric pressure chamber 60 is open to an atmosphere so that the air pressure therein is maintained at an atmospheric pressure. The tire air pressure chamber 62 is communicated with the interior of the tire 16 so that the air pressure inside the tire air pressure chamber 62 is maintained at an air pressure equal to the air pressure in the tire 16.

The pressurization limiting piston 58 is movable in a circumferential direction of the wheel 18 along the second cylinder 42 in accordance with the air pressure inside the tire 16. There are provided inside the pressurization limiting piston 58 a pressurization air passage 64 and a depressurization air passage 66. The pressurization air passage 64 causes the interior of the tire 16 to communicate with the pressurization chamber 50. The depressurization air passage 66 causes the interior of the tire 16 to communicate with the atmospheric air chamber 60. In the present embodiment, a part of the pressurization air passage 64 and a part of the depressurization air passage 66 are formed by the same passage that communicates with the interior of the tire 16 through a pressurization and depressurization air hole 68 provided in the second cylinder 42.

The pressurization air passage 64 is located at a position where the interior of the tire 16 and the pressurization chamber 50 are caused to communicate with each other through the pressurization air communication hole 44 and the depressurization air hole 68 when the pressurization limiting piston 58 is located at a position closer to the side of the tire pressure chamber 62 than a predetermined position, but, the pressurization air passage 64 is disconnected from the pressurization air communication hole 44 when the pressurization limiting piston 58 moves to the predetermined position. Thus, when the air pressure inside the tire 16 is in excess and is higher than a predetermined air pressure, the pressurization limiting piston 58 moves to the predetermined position or closer to the side of the atmospheric pressure chamber 60 where the pressurization air passage 64 is closed by a wall separating the first cylinder 40 and the second cylinder 42 from each other, and, thereby, the pressurization air passage 64 does not cause the interior of the tire 16 and the pressurization chamber 50 to communicate with each other. It should be noted that the "predetermined air pressure" mentioned here is preferably a value equal to or smaller than an upper limit value of the air pressure at which the tire can maintain normally. In the present embodiment, the predetermined air pressure is set to 400 kPa (kilopascal). Additionally, the "predetermined position" is a position at which the pressure limiting piston 58 moves when the air pressure inside the tire 16 is higher than the "predetermined air pressure", which is determined appropriately in accordance with the "predetermined air pressure". A pressurization adjusting valve 70 is provided to an intermediate part of the pressurization air passage 64 so as to adjust an amount of air flowing through the pressurization air passage 64.

The pressurization valve 70 opens when a pressure of air inside the pressurization chamber 50 is higher than an air pressure inside the tire 16 so as to supply air into the interior of the tire 16 from the pressurization chamber 50 through the pressurization air communication hole 44, the pressurization air passage 64 and the pressurization and depressurization air hole 68. On the other hand, the pressurization valve 70 closes when a pressure of air inside the pressurization chamber 50 is equal to or lower than an air pressure inside the tire 16 so as to stop the supply of air into the interior of the tire 16 from the pressurization chamber 50.

The depressurization air passage 66 is located at a position where the pressurization limiting piston 58 communicates with the interior of the tire 16 through the pressurization and depressurization air hole 68 when the pressurization limiting piston 58 is at any position within the second cylinder 42. A depressurization adjusting valve 72 is provided to an intermediate part of the depressurization air passage 66 so as to adjust an amount of air flowing through the depressurization air passage 66.

The depressurization adjusting valve 72 opens, when the air pressure inside the tire 16 increases higher than a predetermined air pressure, so as to release air from the interior of the tire 16. On the other hand, the depressurization adjusting valve 72 closes, when the air pressure inside the tire 16 is equal to or lower than the predetermined air pressure, so as to stop the release of air from the interior of the tire 16. It should be noted that the "predetermined air pressure" mentioned here is preferably an upper limit value of the internal air pressure which the tire 16 can maintain normally. In the present embodiment, the predetermined air pressure is set to 400 kPa (kilopascal). A depressurization adjusting spring 74 is provided in the depressurization adjusting valve 72 so as to adjust a degree of opening of the depressurization adjusting valve 72.

The depressurization adjusting spring 74 is one of elements that determine a magnitude of depressurization of the air inside the tire 16 when the tire pressure adjusting apparatus 36 serves as a depressurizing means for depressurizing the air inside the tire 16. Thus, characteristics of the depressurization adjusting spring 74 such as a spring constant is determined so that the air pressure inside the tire 16 is appropriately decreased when the tire pressure adjusting apparatus 36 serves as the depressurizing means.

The atmospheric pressure chamber 60 is a chamber into which the air released from the interior of the tire 16 is released through the depressurization air passage 66. The released air can be discharged outside the wheel assembly 14. A pressurization limiting piston adjusting spring 76 is provided inside the atmospheric pressure chamber 60.

The pressurization limiting piston adjusting spring 76 is one of elements that determine a magnitude of limitation of a pressurizing operation when the tire pressure adjusting apparatus 36 serves as a pressurization limiting means for limiting the pressurizing operation of the air inside the tire 16. Thus, characteristics of the pressurization limiting piston adjusting spring 76 such as a spring constant is determined so that the pressurizing operation to the air pressure inside the tire 16 is appropriately limited when the tire pressure adjusting apparatus 36 serves as the pressurization limiting means.

The air pressure in the tire pressure chamber 62 is maintained to be equal to the air pressure inside the tire 16 since a part of the tire pressure chamber 62 is open to the interior of the tire 16. The tire pressure chamber 62 is located adjacent to the pressurization limiting piston 58. Accordingly, the pressurization limiting piston 58 moves along the second cylinder 42 in accordance with the air pressure in the tire pressure chamber 62, that is, the air pressure inside the tire 16. When a force exerted on the pressurization limiting piston 58 by the air pressure inside the tire pressure chamber 62 becomes larger than a resultant force of a force due to the air pressure in the atmospheric pressure chamber 60 and a force generated by the pressurization limiting piston adjusting spring 76, the pressurization limiting piston 58 moves toward the side of the atmospheric pressure chamber 60.

The tire pressure adjusting apparatus 36 having the above-mentioned structure serves, as mentioned below, as the pressurizing means for pressurizing the air inside the tire, the depressurizing means for depressurizing the air inside the tire and the pressurization limiting means for limiting an operation of the pressurizing means.

First, a description will be given of a case where the tire pressure adjusting apparatus 36 serves as the pressurizing means when the air pressure inside the tire 16 is in an insufficient state. It should be noted that, in the present embodiment, a case where the air pressure inside the tire 16 is smaller then 200 kPa is referred to as the insufficient state of the air pressure inside the tire 16.

In this case, the pressurization limiting piston 58 moves to a limit position on the side of the tire pressure chamber 62 by being pressed by the pressurization limiting piston adjusting spring 76, and a volume of the tire pressure chamber 62 is substantially zero. Accordingly, the pressurization air passage 64 in the pressurization limiting piston 58 is arranged at a position corresponding to the pressurization air communication hole 44 and the depressurization air hole 68, which causes the pressurization chamber 50 and the interior of the tire 16 to communicate with each other through the pressurization air communication hole 44, the pressurization air passage 64 and the pressurization and depressurization air hole 68.

Then, when the vehicle 10 moves and the wheel assembly 14 rotates, a centrifugal force corresponding to a centrifugal force corresponding to a rotation speed of the wheel assembly 14 is exerted on the pressurizing piston 46. Thus, the pressurizing piston 46 moves to the side of the pressurization chamber 50 against the pressure by the pressurizing piston adjusting spring 56 and the air pressure in the pressurization chamber 50 so as to compress and pressurize the air in the pressurization chamber 50 in accordance with the centrifugal force exerted thereon.

At this time, if the pressure of the air in the pressurization chamber 50 becomes higher than the pressure of the air inside the tire 16, the air in the pressurization chamber 50 flows into the tire 16 through the pressurization air communication hole 44, the pressurization air passage 64 and the pressurization and depressurization air hole 68. Accordingly, the air inside the tire 16 is pressurized, which eliminates the insufficiency of the air pressure in the tire 16.

It should be noted that a magnitude of pressurization of the air inside the tire 16 depends on a degree of the centrifugal force exerted on the pressurizing piston 46, a cross-sectional area of the pressurizing piston which gives a pressure to the air in the pressurization chamber 50, a spring constant of the pressurizing piston adjusting spring, etc. Thus, it is necessary to appropriately adjust these conditions to achieve an appropriate air pressure in the tire 16. For example, when a vehicle speed is maintained at 50 km/h using the pressurizing piston having a weight of about 50 g in a case where the tire pressure adjusting apparatus 36 is mounted on an outer peripheral portion of the wheel 18 having a diameter of about 16 inches, it is preferable to design and adjust component parts so that air inside the tire 16 is pressurized to a level ranging from 200 kPa to 400 kPa.

A description will now be given of the case where the tire pressure adjusting apparatus 36 serves as the depressurizing means and the pressurization limiting means when the air pressure inside the tire 16 is in an excessive state. It should be noted that, in the present embodiment, a case where the air pressure inside the tire 16 is higher than 400 kPa is referred to as an excessive state of the air pressure inside the tire 16.

In this case, the pressurization limiting piston 58 is pressed by air flowing into the tire pressure chamber 62 from the interior of the tire 16, and moves to the predetermined position or a position closer to the side of the atmospheric pressure chamber 60 than the predetermined position. With the movement of the pressurization limiting piston 58, the pressurization air passage 64 in the pressurization limiting piston 58 causes the pressurization chamber 50 and the interior of the tire 16 to be disconnected from each other. Thus, the passage to supply air to the interior of the tire 16 from the pressurization chamber 50 is cut off, which causes the tire pressure adjusting apparatus 36 to serve as the pressurization limiting means for limiting an operation as the pressurizing means for pressurizing the air inside the tire 16. Accordingly, if the air pressure inside the tire 16 exceeds 400 kPa and the excessive state is established, and even if a large centrifugal force is exerted on the pressurizing piston 46 and the pressure of the air in the pressurization chamber 50 is increased to any high value, the air in the pressurization chamber 50 is prevented from being supplied to the interior of the tire 16, which effectively prevents the air pressure inside the tire 16 from being further increased.

It should be noted that a magnitude of the limitation in the pressurization of the air inside the tire according to the thus-operating pressurization limiting piston 58 depends on a degree of the force exerted on the pressurization limiting piston 58 when the wheel assembly 14 is rotated, a cross-sectional area of the pressurization limiting piston 58 that is pressed from the side of the tire pressure chamber 62 by the air inside the tire 16, a spring constant of the pressurizing piston adjusting spring 76, etc. Accordingly those values must be appropriately adjusted so that the pressurization limiting piston 58 appropriately limits the pressurization of the air inside the tire 16 when the air pressure in the tire 16 is in excess.

Then, if the air pressure in the tire is set in an excessive state, the depressurization adjusting valve 72 opens, and, thereby, the tire pressure adjusting apparatus 36 serves as the depressurizing means. By the depressurization adjusting valve being opened, the air inside the tire 16 is released into the atmospheric pressure chamber 60 through the pressurization and depressurization air hole 68 and the depressurizing air passage 66. Thereby, the interior of the tire 16 is depressurized, which eliminated the excessive state of the air pressure inside the tire 16.

As mentioned above, according to the tire air pressure adjusting apparatus 36 of the present embodiment, the air pressure in the tire 16 is increased in accordance with the operation of the pressurizing piston when the air pressure in the tire 16 is insufficient, and the air pressure in the tire 16 is decreased in accordance with the opening operation of the depressurization adjusting valve 72 in the pressurization limiting piston 58 when the air pressure in the tire 16 is in excess. Especially, since the pressurization limiting piston 58 also serves as the pressurization limiting means in accordance with the air pressure inside the tire 16, the operation of pressurizing piston 46 is limited when the air pressure inside the tire 16 is in excess. Thus, the air pressure inside the tire 16 is positively prevented from being further increased, which achieves an efficient depressurization of the air inside the tire 16.

As mentioned above, the air pressure in the tire 16 is positively adjusted to an appropriate state by being increased or decreased, which quickly and positively prevents the air pressure in the tire 16 from being excessively low or excessively high so as to achieve safe and comfortable running of the vehicle 10.

Additionally, the pressurizing means, the depressurizing means and the pressurization limiting means are achieved with a relatively simple mechanical structure, and also achieved by the tire pressure adjusting apparatus 36 that is integrally provided to the wheel assembly 14. Thus, there is no need to perform a complicated process such as an electronic controller. The air pressure inside the tire 16 can be maintained at an appropriate state by merely mounting the tire pressure adjusting apparatus 36 according to the present embodiment to the wheel assembly 14.

A description will now be given of a wheel condition determining apparatus, which detects an abnormality in the wheel 14 equipped with the tire pressure adjusting apparatus 36.

Figure 4:
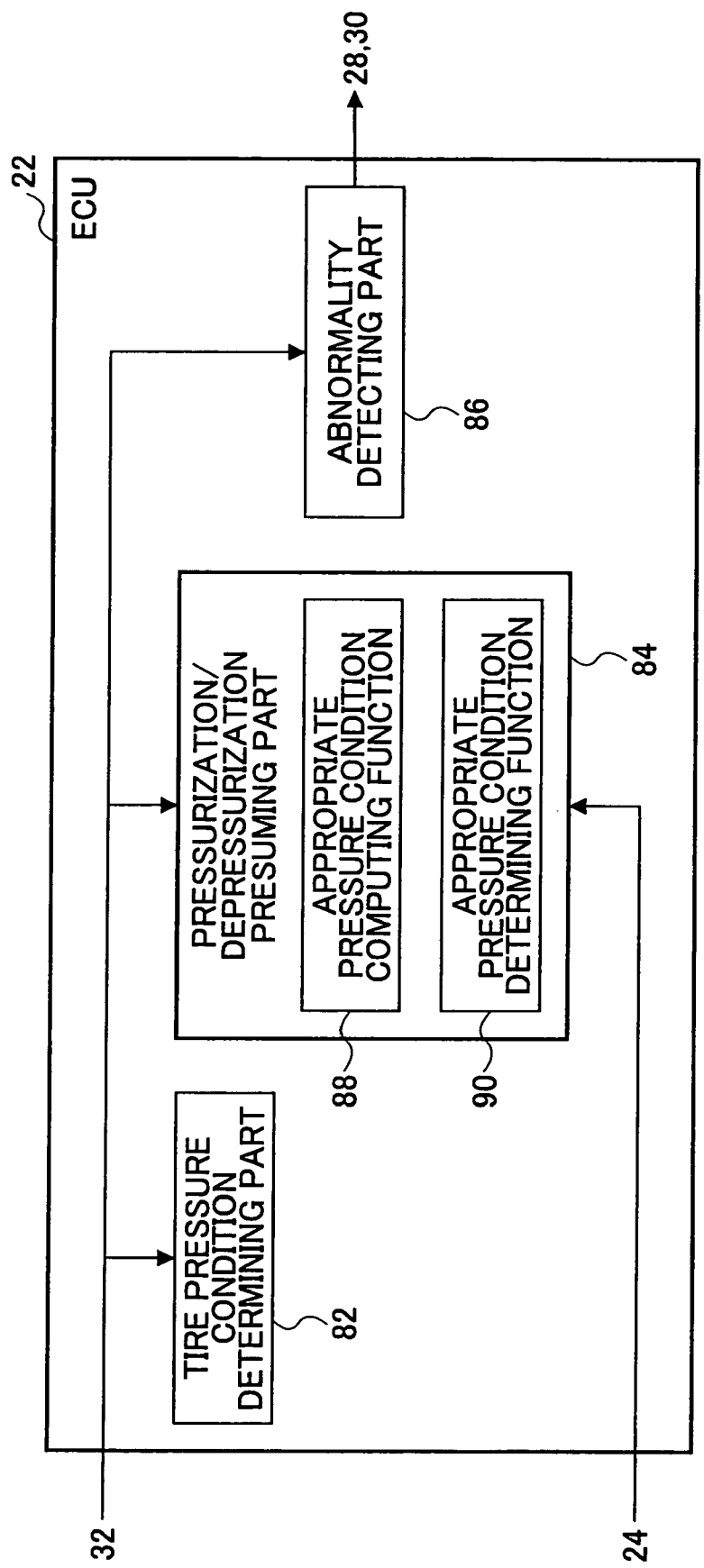
FIG. 4 is a block diagram of an electronic control unit involved in detection of an abnormality in the tire pressure adjusting apparatus.

FIG. 4 is a block diagram of an electronic control unit (ECU) involved in detection of an abnormality in the tire pressure adjusting apparatus. The ECU 22 shown in FIG. 2 comprises: a tire pressure condition determining part 82 which determines conditions of the air pressure inside the tire 16; a pressurization/depressurization presuming part 84 which presumes a pressurizing condition or a depressurizing condition of the air in the tire 16 by the tire pressure adjusting apparatus 36; and an abnormality detecting part 86 which detects an abnormality in the tire pressure adjusting apparatus 36 in accordance with a result of detection of the TPMS 32 and a result of presumption of the pressurization/depressurization presuming part 84.

The tire pressure condition determining part 82 determines as to whether the air pressure in the tire 16 is in an insufficiently low state, an excessively high state or a normal state in accordance with a result of detection of the TPMS 32 that is sent from the TPMS 32 through each wheel side transmitter 34 and the vehicle body side transmitter 26. In the present embodiment, it is determined that: the air pressure inside the tire 16 is insufficient when the result of detection of the TPMS 32 indicates that the air pressure is lower than 200 kPa; the air pressure inside the tire 16 is in excess when the result of detection of the TPMS 32 indicates that the air pressure is higher than 400 kPa; and the air pressure inside the tire 16 is normal when the result of detection of the TPMS 32 indicates that the air pressure falls within the range from 200 kPa to 400 kPa.

The pressurization/depressurization presuming part 84 comprises: an appropriate pressure condition computing function 88, which acquire from a result of detection of the TPMS 32 a condition to return the air pressure inside the tire 16 to a normal state; and an appropriate condition determining function 90 which determines whether or not the condition acquired by the appropriate condition determining function 88 is satisfied actually.

The appropriate condition computing function 88 first determines in accordance with a result of determination of the tire pressure condition determining part 82 as to which of "pressurization", "depressurization" and "sustainment" is needs. Then, if either of "pressurization" and "depressurization" is needed, the appropriate condition computing function 88 computes as to which condition is to be satisfied so as to "pressurized" or "depressurized" the air pressure inside the tire 16 to a normal appropriate condition. For example, if it is determined by the tire pressure condition determining part 82 that the air pressure inside the tire 16 is insufficient, it is computed in accordance with a result of detection by the TPMS 32 as to what magnitude of speed is to be achieved and for how long. Similarly, if it is determined that the air pressure inside the tire 16 is in excess by the tire pressure condition determined part 82, it is computed in accordance with a result of detection of the TPMS 32 as to how long the depressurization adjusting valve 72 should be opened so as to decrease the air pressure inside the tire 16 to a normal state.

The appropriate condition determining function 90 determines whether or not an actual condition satisfies the "condition to return the air pressure inside the tire 16 to a normal and appropriate state" computed by the appropriate condition computing function 88. For example, if it is determined by the tire pressure condition determining part 82 that the air pressure inside the tire 16 is insufficient, it is determined in accordance with results of detection of the wheel speed sensors 24 what magnitude of vehicle speed has been achieved for how many times and how long so as to determine whether the actual condition of the vehicle 10 satisfies the "condition to return the air pressure inside the tire 16 to the normal and appropriate state". On the other hand, if it is determined by the tire pressure condition determining part 82 that the air pressure inside the tire 16 is in excess, it is determined how long the depressurization adjusting valve 72 is opened so as to determined whether the actual condition of the vehicle 10 satisfies the "condition to return the air pressure inside the tire 16 to the normal and appropriate state".

The abnormality detecting part 86 detects whether or not the air pressure inside the tire 16 has been returned the normal and appropriate state actually in accordance with a result of detection of the TPMS 32 when it is determined by the appropriate condition determining function 90 of the pressurization/depressurization presuming part 84 that the "condition to return the air pressure inside the tire 16 to the normal and appropriate state" is satisfied. If it is detected that the air pressure inside the tire 16 has not been returned to the normal and appropriate state, it indicates that the tire pressure adjusting apparatus 36 is not normally functioning. Thus, the abnormality detecting part 86 determines that an abnormality occurs in the tire pressure adjusting apparatus 36, and calls an attention of a driver of the vehicle 10 by operating the warning lamp 28 or the warning buzzer 30. On the other hand, if it is detected that the air pressure inside the tire 16 has been returned to the normal and appropriate state, it indicates that the tire pressure adjusting apparatus 36 is normally functioning. Thus, the abnormality detecting part 86 determines that there is no abnormality occurring in the tire pressure adjusting apparatus 36.

Figure 5:
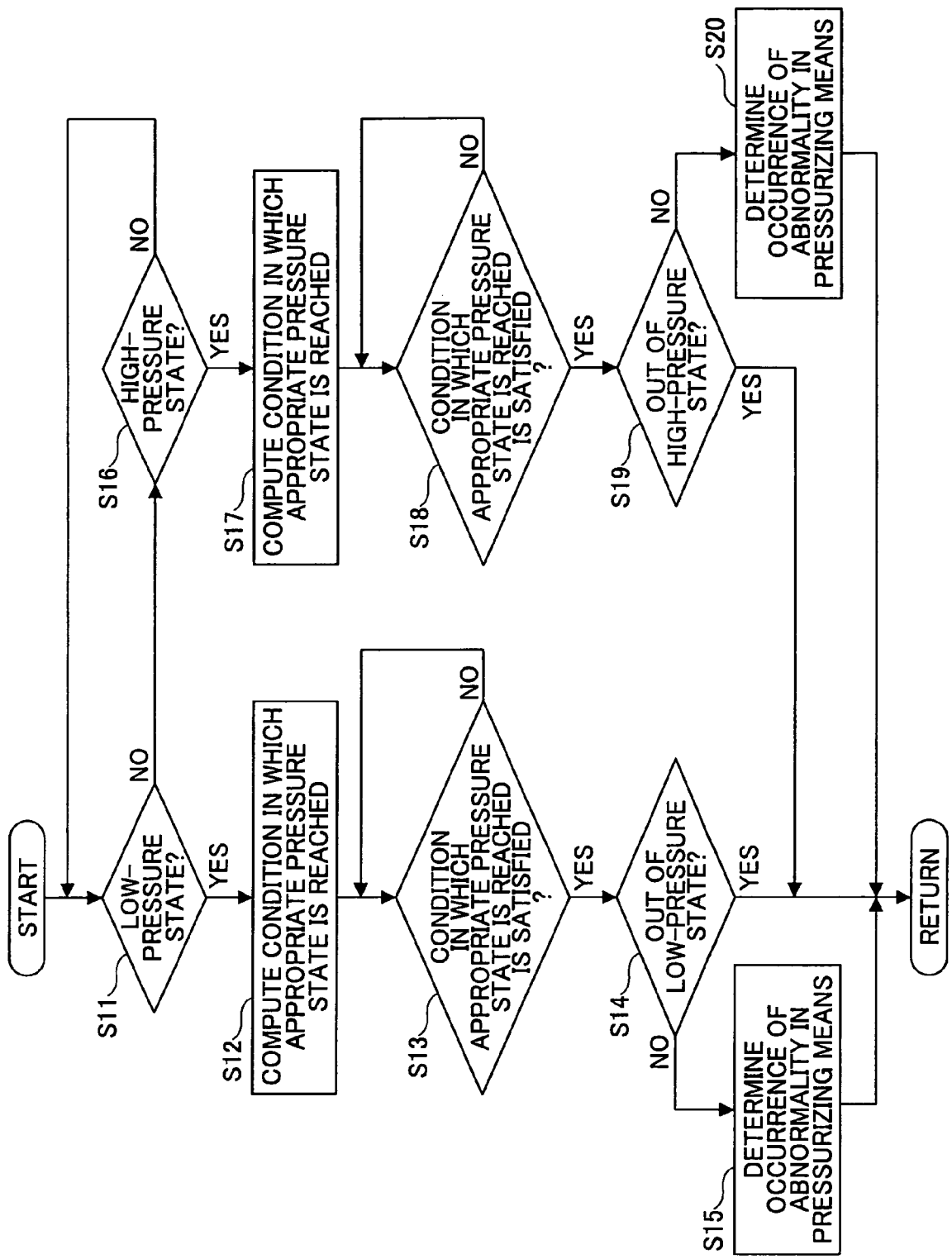
FIG. 5 is a flowchart of an abnormality detecting process performed by the tire pressure adjusting apparatus.

A description will now be given, with reference to FIG. 5, of an operation of detecting an abnormality performed by the tire pressure adjusting apparatus 36. FIG. 5 is a flowchart of an operation of detecting an abnormality performed by the tire pressure adjusting apparatus 36.

First, it is determined by the tire pressure condition determining part 82 of the ECU 22 whether or not the air pressure P inside the tire 16 is in a low-pressure state (step S11 of FIG. 5). Specifically, it is determined whether or not the following relationship (1) is satisfied. It should be noted that THp1 is a threshold value used for determining that the air pressure inside the tire 16 is in a low-pressure state, and is preferably a value equal to or smaller than a minimum value which defines a normal range of the air pressure inside the tire 16. In the present embodiment, THp1 is set to 200 kPa (THp1=200 kPa).

$$P < THp1 \quad (1)$$

If it is determined that the above-mentioned relationship (1) is satisfied and the air pressure inside the tire 16 is in a low-pressure state (YES of step S1), the "condition in which the air pressure inside the tire 16 is increased to an appropriate state" is computed by the appropriate condition computing function 88 of the pressurization/depressurization presuming part 84 (step S12). Then, it is determined by the appropriate condition determining function 90 whether or not the actual condition of the vehicle 10 satisfies the "condition in which the air pressure inside the tire 16 is increased to an appropriate state" (step S13). If it is determined that the actual condition of the vehicle 10 does not satisfy the "condition in which the air pressure inside the tire 16 is increased to an appropriate state" (NO of step S13), the appropriate condition determining function 90 of the pressurization/depressurization presuming part 84 continuously performs the determination until the actual condition of the vehicle 10 satisfies the "condition in which the air pressure inside the tire 16 reaches the appropriate state".

If it is determined that the actual condition of the vehicle 10 satisfies the "condition in which the air pressure inside the tire 16 is increased to an appropriate state" (YES of step S13), it is then determined by the abnormality detecting part 86 whether or not the actual air pressure P inside the tire 16 is in an appropriate state (step S14). Specifically, the determination is performed in accordance with whether or not the following relationship (2) is satisfied.

$$P \geq THp1 \quad (2)$$

If it is determined that the above-mentioned relationship is satisfied and the actual air pressure P inside the tire 16 is in a normal state (YES of step S14), it can be determined that the tire pressure adjusting apparatus 36 is operating normally as the pressurizing means and the air inside the tire 16 is appropriately pressurized. Then, the detection of an abnormality in the tire pressure adjusting apparatus 36 is performed again (step S11).

If it is determined that the above-mentioned relationship (2) is not satisfied and the actual air pressure is still in an insufficient state (NO of step S14), it can be determined that an abnormality occurs in a part constituting the pressurizing means in the tire pressure adjusting apparatus 36 and the air inside the tire 16 is not appropriately pressurized (step S15). In this case, the abnormality detecting part 86 of the ECU 22 causes the warning lamp 28 or the warning buzzer 30 to operate so as to notify the driver of the vehicle 10 of an occurrence of an abnormality in the pressurizing means of the tire pressure adjusting apparatus 36.

On the other hand, if it is determined that the above-mentioned relationship (1) is not satisfied and the air pressure inside the tire 16 is not in the low-state (NO of step S11), it is determined by the tire pressure condition determining part 82 whether or not the air pressure P inside the tire 16 is in a high-pressure state (step S16). Specifically, it is determined whether or not the following relationship (3) is satisfied. It should be noted that THp2 is a threshold value used for determining that the air pressure inside the tire 16 is in a high-pressure state, and is preferably a value equal to or greater than a maximum value which defines the normal range of the air pressure inside the tire 16. In the present embodiment, THp2 is set to 400 kPa (THp2=400 kPa).

$$P > THp2 \quad (3)$$

If it is determined that the above-mentioned relationship (3) is not satisfied and the air pressure inside the tire 16 is not in the high-state (NO of step S16), it is determined that the air pressure inside the tire 16 is in a normal state and an abnormality in the tire pressure adjusting apparatus cannot be detected. Thus, the determination of condition (steps S11 and S16) is repeated until the air pressure inside the tire 16 becomes an insufficient state or an excessive state.

On the other hand, if it is determined that the above-mentioned relationship (3) is satisfied and the air pressure inside the tire 16 is in a high-pressure state (YES of step S16), the "condition in which the air pressure inside the tire 16 is decreased to an appropriate state" is computed by the appropriate condition computing function 88 of the pressurization/depressurization presuming part 84 (step S17). Then, it is determined by the appropriate condition determining function 90 whether or not the actual condition of the vehicle 10 satisfies the "condition in which the air pressure inside the tire 16 is decreased to an appropriate state" (step S18). If it is determined that the actual condition of the vehicle 10 does not satisfy the "condition in which the air pressure inside the tire 16 is decreased to an appropriate state" (NO of step S18), the appropriate condition determining function 90 of the pressurization/depressurization presuming part 84 continuously performs the determination until the actual condition of the vehicle 10 satisfies the "condition in which the air pressure inside the tire 16 is decreased to an appropriate state".

If it is determined that the actual condition of the vehicle 10 satisfies the "condition in which the air pressure inside the tire 16 is decreased to an appropriate state" (YES of step S18), it is then determined by the abnormality detecting part 86 whether or not the actual air pressure P inside the tire 16 is in an appropriate state (step S19). Specifically, the determination is performed in accordance with whether or not the following relationship (4) is satisfied.

$$P \leq THp2 \quad (4)$$

If it is determined that the above-mentioned relationship is satisfied and the actual air pressure P inside the tire 16 is in a normal state (YES of step S19), it can be determined that the tire pressure adjusting apparatus 36 is operating normally as the depressurizing means and depressurization limiting means and the air inside the tire 16 is appropriately depressurized. Then, the detection of an abnormality in the tire pressure adjusting apparatus 36 is performed again (step S11).

If it is determined that the above-mentioned relationship (4) is not satisfied and the actual air pressure is still in an insufficient state (NO of step S19), it can be determined that an abnormality occurs in a part constituting the depressurizing means or the pressurization limiting means in the tire pressure adjusting apparatus 36 and the air inside the tire 16 is not appropriately pressurized (step S25). In this case, the abnormality detecting part 86 of the ECU 22 causes the warning lamp 28 or the warning buzzer 30 to operate so as to notify the driver of the vehicle 10 of an occurrence of an abnormality in the depressurizing means or the pressurization limiting means of the tire pressure adjusting apparatus 36.

According to the wheel condition determining apparatus realized as mentioned above, an abnormality in the tire pressure adjusting apparatus 36 serving as the pressurizing means, the depressurizing means and the pressurization limiting means can be accurately detected and a notification can be sent to the driver of the vehicle 10. Thus, a normal operation of the tire pressure adjusting apparatus 36 during normal run of the vehicle 10, and the air pressure inside the tire 16 can be maintained positively at an appropriate state by the tire pressure adjusting apparatus 36.

Especially, the tire pressure adjusting apparatus 36 of the present embodiment is achieved by a mechanical hardware structure alone, and, therefore, it may be difficult to rapidly detect an abnormality such as a malfunction. However, using the above-mentioned wheel condition determining apparatus enables rapid detection of an abnormality in the tire pressure adjusting apparatus 36, which further improves safety of run of the vehicle 10.

Second Embodiment

In the present embodiment, parts that are the same as the parts described in the above-mentioned first embodiment are given the same reference numerals, and descriptions thereof will be omitted.

Figure 6:
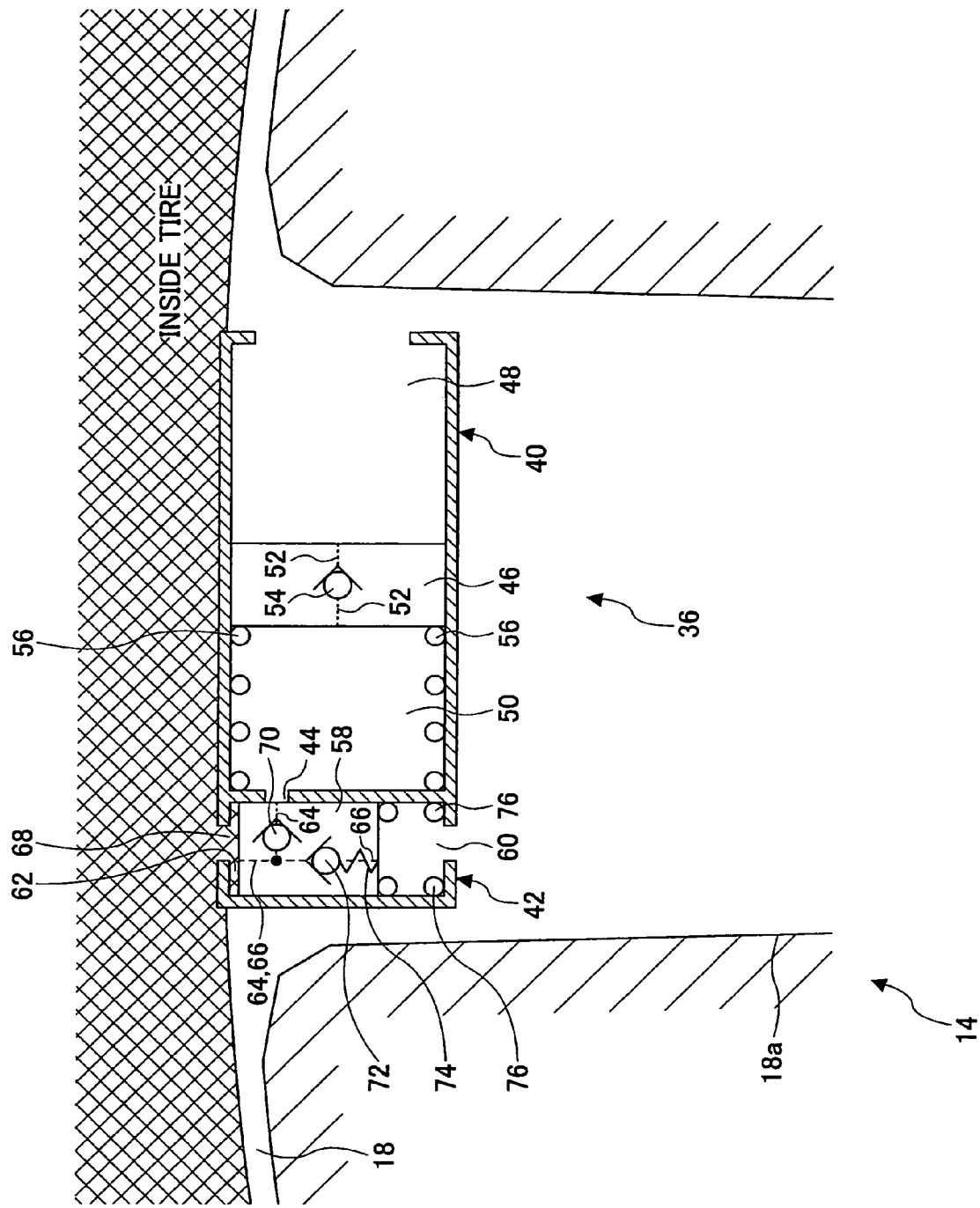
FIG. 6 is a cross-sectional view of a tire pressure adjusting apparatus according to a second embodiment of the present invention.

FIG. 6 is a cross-sectional view of the tire pressure adjusting apparatus 36 according to a second embodiment of the present invention. In the present embodiment, the tire pressure adjusting apparatus 36 has a transversely elongated configuration extending along the outer circumference of the wheel 18 as shown in FIG. 6.

In the tire pressure adjusting apparatus 36, the first cylinder 40 is provided on a rear side in a direction of rotation of the wheel 18, and the second cylinder 42 is provided on a front side in the direction of rotation of the wheel 18 so as to be adjacent to the first cylinder 40.

The interior of the first cylinder 40 is separated into the pressurization air supply chamber 48 and the pressurization chamber 50 by the pressurizing piston 46 accommodated in the first cylinder 40 without air gaps therebetween so that the pressurization air supply chamber 48 is located on the rear side in the direction of rotation of the wheel and the pressurization chamber 50 is located on the front side in the direction of rotation of the wheel 18. The pressurizing piston 46 is movable in a circumferential direction of the wheel 18 along the first cylinder 40 using a "force generated in a circumferential direction of the wheel assembly 14", which corresponds to an acceleration in rotation of the wheel assembly 14.

The interior of the second cylinder 42 is separated into the tire pressure chamber 62 and the atmospheric pressure chamber 60 by the pressurization limiting piston 58 accommodated in the second cylinder 42 without air gaps therebetween so that the tire pressure chamber 62 is located on a peripheral side of the wheel 18 and the atmospheric pressure chamber 60 is located on a side of the center of rotation of the wheel 18. The pressurization limiting piston 58 is movable in a radial direction of the wheel 18 along the second cylinder 40 in accordance with the air pressure in the tire pressure chamber 62, that is, the air pressure inside the tire 16.

It should be noted that, in the present embodiment, a part causing the interior the tire 16 and the tire pressure chamber 62 to communicate with each other and the pressurization/depressurization air hole 68 are formed in the same location.

Other structures of the tire pressure adjusting apparatus 36 according to the present embodiment are the same as the tire pressure adjusting apparatus 36 according to the first embodiment shown in FIGS. 1 through 5. Similar to the first embodiment, the tire pressure adjusting apparatus 36 according to the present embodiment also serves as the pressurizing means, the depressurizing means and the pressurization limiting means.

When the air pressure inside the tire 16 is in an insufficient state, the pressurization limiting piston 58 is pressed by the pressurization limiting piston adjusting spring 76 and moves to a limit position on the side of the tire pressure chamber 62, and the pressurization air passage 64 in the pressurization limiting piston 58 is located at a position corresponding to the pressurization air communication hole 44 and the pressurization/depressurization air hole 68. Accordingly, the pressurization chamber 50 and the interior of the tire 16 are caused to be communicated with each other by the pressurization air communication hole 44, the pressurization air passage 64 and the pressurization/depressurization air hole 68. Thus, when the vehicle 10 travels and the wheel assembly 14 rotates, the pressurizing piston 46 moves to the side of the pressurization chamber 50 or to the side of the pressurization air supply chamber 48 due to the "force in the circumferential direction of the wheel assembly 14" corresponding to an acceleration in rotation of the wheel 14. For example, in a case where the wheel assembly 14 rotates from the right side toward the left side in FIG. 6 during forward travel of the vehicle, when the vehicle is decelerated, that is, when a deceleration is applied to the rotating speed in the forward direction of the wheel assembly 14, the pressurizing piston 46 moves to the side of the pressure chamber 50 against the pressing force by the pressurizing piston adjusting spring 56 and the air pressure in the pressurization chamber 50. Then the pressurizing piston 46 compresses and pressurizes the air in the pressurization chamber 50 in accordance with the "force in the circumferential direction of the wheel 14" exerted thereon. If the pressure of the air in the pressurization chamber 50 becomes higher than the pressure of the air in the tire 16, the air in the pressurization chamber 50 flows into the interior of the tire 16 through the pressurization air communication hole 44, the pressurization air hole 64 and the pressurization/depressurization air hole 68, and, thereby, the air pressure inside the tire 16 is increased. Thus, the air pressure inside the tire 16 is increased by the pressurizing piston 46 being applied with the "force in the circumferential direction of the wheel assembly 14", which moves the pressurizing piston to the side of the pressurization chamber 50, during a deceleration of the vehicle when the wheel assembly 14 rotates from the right side toward the left side in FIG. 6 and the vehicle travels forward, and the "force in the circumferential direction of the wheel assembly 14" is applied to the pressurizing piston 46 during an acceleration of the vehicle so that the pressurizing piston 46 moves to the side of the pressurization air supply chamber 48. It should be noted that in a case where the wheel assembly 14 rotates in a direction from the left side toward the right side of FIG. 6 when the vehicle travels forward, the pressurizing piston 46 moves to the side of the pressurization chamber 50 during an acceleration of the vehicle so as to pressurize the air in the tire 16, and moves to the side of the pressurization air supply chamber 48 during a deceleration of the vehicle.

On the other hand, when the air pressure inside the tire 16 is in an excessive state, the pressurization limiting piston 58 is pressed by the air flowing from the interior of the tire 16 into the tire pressure chamber 62, and moves to a predetermined position or a position closer to the atmospheric pressure chamber 60 than the predetermined position, which causes the pressurization air passage 64 in the pressurization limiting piston 58 to be disconnected from the pressure chamber 50 and the interior of the tire 16. Thereby, the supply passage of air to the interior of the tire 16 is cut off, and the tire pressure adjusting apparatus 36 serves as the pressurization limiting means for limiting an operation as the pressurizing means for pressurizing the air inside the tire 16. Then, the depressurization adjusting valve 72 opens and air is released from the interior of the tire 16 into the atmospheric pressure chamber 60 through the pressurization/depressurization air hole 68 and the depressurization air passage 66, which results in the air pressure inside the tire 16 being decreased. Thereby, the excessive state of the air pressure inside the tire 16 is prevented, and the air pressure inside the tire 16 is positively decreased.

As mentioned above, also in the present embodiment, the air pressure in the tire 16 is increased in accordance with the operation of the pressurizing piston when the air pressure in the tire 16 is insufficient, and the air pressure in the tire 16 is decreased in accordance with the opening operation of the depressurization adjusting valve 72 in the pressurization limiting piston 58 when the air pressure in the tire 16 is in excess. The pressurization limiting piston 58 also serves as the pressurization limiting means in accordance with the air pressure inside the tire 16. Accordingly, the air pressure inside the tire 16 is positively adjusted to an appropriate state, which realizes a safe and comfortable run of the vehicle 10.

Especially, in the present embodiment, since the pressurizing piston 46 is driven by the "force in the circumferential direction of the wheel assembly 14" corresponding to the acceleration in rotation of the wheel assembly 14, the air inside the tire 16 is increased in response to a frequency of acceleration and deceleration of the vehicle 10 that causes acceleration and deceleration of rotation of the wheel assembly 14. Accordingly, the air inside the tire 16 is more rapidly pressurized as the driver of the vehicle 10 attempts acceleration and deceleration of the vehicle 10 more frequently.

It should be noted that, generally, the "force in the circumferential direction of the wheel assembly 14" exerted on the pressurizing piston 46 in response to an acceleration in rotation of the wheel assembly 14 is smaller than a "centrifugal force" exerted on the wheel assembly 14 during rotation of the wheel assembly 14. Accordingly, in order to increase the air pressure in the pressurization chamber 50 and the air pressure in the tire 16 at a magnitude the same as that of the above-mentioned first embodiment, an inner diameter of a part constituting the pressurization chamber 50 in the first cylinder 40 may be set smaller than that in the first embodiment.

Third Embodiment

In a third embodiment of the present invention, parts that are the same as the parts described in the above-mentioned first embodiment are given the same reference numerals, and descriptions thereof will be omitted.

Figure 7:
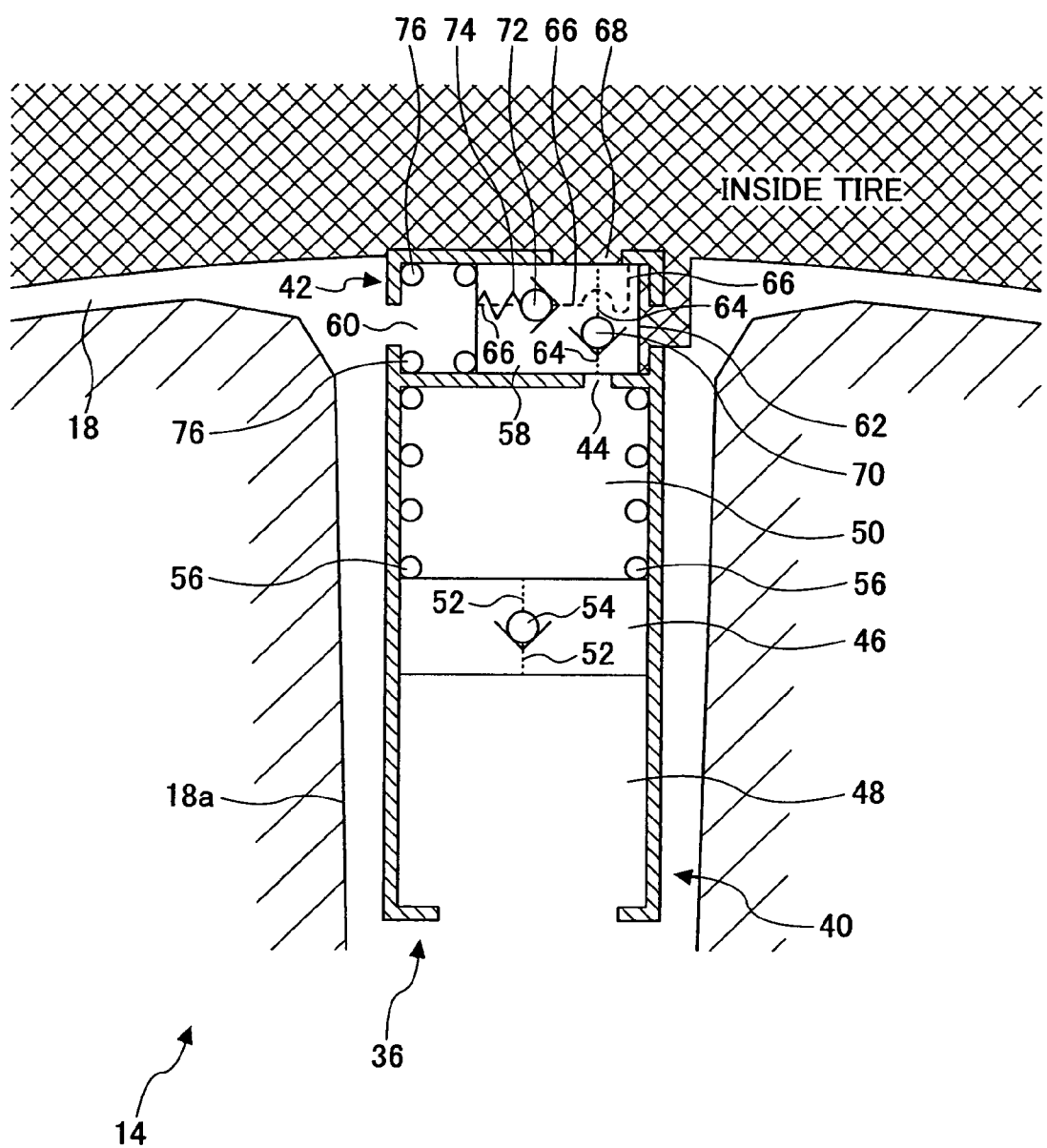
FIG. 7 is a cross-sectional view of a tire pressure adjusting apparatus according to a third embodiment of the present invention.

FIG. 7 is a cross-sectional view of the tire pressure adjusting apparatus 36 according to a third embodiment of the present invention. In the present embodiment, the pressurization air passage 64 and the depressurization air passage 66 are provided as separate air passages, and the two air passages do not have a common passage.

The depressurization air passage 66 is provided at a position where the depressurization air passage 66 causes the atmospheric pressure chamber 60 and the interior of the tire 16 to communicate with each other through the pressurization/depressurization air hole 68 when the pressurization limiting piston 58 is located at a position closer to the atmospheric pressure chamber than the predetermined position, but, when the pressurization limiting piston 58 moves to the predetermined position, the depressurization air passage 66 is disengaged from the pressurization/depressurization air hole 68. Accordingly, in a case where the air pressure in the tire 16 is insufficiently lower than a predetermined air pressure, when the pressurization limiting piston 58 moves to the predetermined position or a position closer to the tire pressure chamber 62 than the predetermined position, the depressurization air passage 66 is closed by a wall separating the interior of the tire 16 and the second cylinder 42 from each other and does not cause the interior of the tire 16 and the atmospheric pressure chamber 60 to communicate with each other.

It should be noted that the "predetermined air pressure" mentioned here is preferably a value smaller than a lower limit value of the air pressure which the tire 16 can maintained normally, and is 200 kPa in the present embodiment. Additionally, the "predetermined position" is a position to which the pressurization limiting piston 58 moves when the air pressure in the tire 16 is smaller than the "predetermined air pressure", and is appropriately determined in accordance with the "predetermined air pressure".

Other structures of the present embodiment are the same as the first embodiment shown in FIGS. 1 through 5. The tire pressure adjusting apparatus 36 according to the present embodiment serves as the pressurizing means, the depressurizing means and the pressurization limiting means similar to the first embodiment, and also serves as the depressurization limiting means for limiting an operation of the depressurizing means.

That is, when the air pressure inside the tire 16 is in an insufficient state and when the pressurization limiting piston 58 is moved to the predetermined position or a position closer to the tire pressure chamber 62 than the predetermined position by being pressed by an atmospheric pressure and the pressurization limiting piston adjusting spring 76, the depressurization air passage 66 in the pressurization limiting piston 58 does not cause the atmospheric pressure chamber 60 and the interior of the tire 16 to communicate with each other. Thereby, a release passage of air from the interior of the tire 16 into the atmospheric pressure chamber 60 is cut off. Thus, the tire pressure adjusting apparatus 36 serves as the depressurization limiting means for limiting an operation of the depressurizing means for depressurizing the air pressure in the tire 16. Therefore, when the air pressure in the tire 16 is in an insufficient state, the air in the tire 16 is not released into the atmospheric pressure chamber 60, which effectively prevents the air pressure in the tire 16 from being further decreased.

As mentioned above, according to the tire pressure adjusting apparatus 36 of the present embodiment, the pressure limiting piston 58 also serves as the depressurization limiting means by moving in response to the air pressure inside the tire 16. Thus, when the air pressure inside the tire is in an insufficient state, the air pressure inside the tire 16 can be positively prevented from being further decreased, which achieves an efficient pressurization of the air inside the tire 16.

The present invention is not limited to the specifically disclosed embodiments and variations and modifications may be made without departing from the scope of the present invention.

For example, although the pressurizing means, the depressurizing means and the pressurization limiting means that adjust the air pressure inside the tire 16 are realized by a piston-cylinder structure in the above-mentioned embodiments, other equipments and structures may be used if they are appropriate.

Additionally, the tire pressure adjusting apparatus 36 can be provided not only to the wheel 18 but also to peripheral positions of the wheel assembly 14 such as an air-valve portion (not shown in the figure) provided for charging air into the tire 16 from outside.

Further, although the case where the TPMS 32 is used as the means for detecting the air pressure inside the tire 16 has been explained, other sensors that can directly or indirectly detects the air pressure inside the tire 16 may be used. In such as case, sensors that can detect an absolute value of the air pressure inside the tire 16 may be preferably used.

The present application is based on Japanese priority application No. 2004-057252 filed Mar. 2, 2004, the entire contents of which are hereby incorporated herein by reference.

What is claimed is:

1. A wheel condition determining apparatus configured and arranged to detect an abnormality of a wheel assembly including a wheel and a tire attached to the wheel and having tire pressure adjusting means, the wheel condition determining apparatus comprising:

tire pressure detecting means for detecting a pressure of air inside the tire; and abnormality detecting means for detecting an abnormality in said tire pressure detecting means.

2. The wheel condition determining apparatus according to claim 1, wherein said tire pressure adjusting means includes pressurizing means for pressurizing the air inside the tire; and said abnormality detecting means includes pressurizing condition presuming means for presuming a pressurized state of the air inside the tire pressurized by said pressurizing means and pressurization abnormality detecting means for detecting an abnormality in said pressurizing means in accordance with a result of detection of said tire pressure detecting means and a result of presumption of said pressurizing condition presuming means.

3. The wheel condition determining apparatus according to claim 1, wherein said tire pressure adjusting means includes depressurizing means for depressurizing the air inside the tire; and said abnormality detecting means includes depressurizing condition presuming means for presuming a depressurized state of the air inside the tire depressurized by said depressurizing means and depressurization abnormality detecting means for detecting an abnormality in said depressurizing means in accordance with a result of detection of said tire pressure detecting means and a result of presumption of said depressurizing condition presuming means.

* * * * *